US012188369B2

(12) United States Patent
Lemmers, Jr. et al.

(10) Patent No.: US 12,188,369 B2
(45) Date of Patent: Jan. 7, 2025

(54) AIRCRAFT TAIL CONE MOUNTED GENERATORS

(71) Applicant: Hamilton Sundstrand Corporation, Charlotte, NC (US)

(72) Inventors: Glenn C. Lemmers, Jr., Loves Park, IL (US); Mark J. Franklin, Janesville, WI (US); David S. Behling, Belvidere, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 37 days.

(21) Appl. No.: 18/166,036

(22) Filed: Feb. 8, 2023

(65) Prior Publication Data

US 2024/0263558 A1  Aug. 8, 2024

(51) Int. Cl.
*F01D 5/02* (2006.01)
*F02C 6/20* (2006.01)
*F02C 7/32* (2006.01)
*F02C 7/36* (2006.01)

(52) U.S. Cl.
CPC ............... *F01D 5/025* (2013.01); *F02C 6/20* (2013.01); *F02C 7/32* (2013.01); *F02C 7/36* (2013.01); *F05D 2220/323* (2013.01); *F05D 2220/76* (2013.01); *F05D 2240/20* (2013.01); *F05D 2240/60* (2013.01)

(58) Field of Classification Search
CPC .......... F01D 5/025; F01D 5/026; F01D 25/24; F02C 6/20; F02C 7/06; F02C 7/32; F02C 7/36; F05D 2220/323; F05D 2220/76; F05D 2240/20; F05D 2240/40
See application file for complete search history.

(56) References Cited

U.S. PATENT DOCUMENTS 9,917,490 B2   3/2018  Lemmers et al.
10,487,839 B2  11/2019 Kupiszewski et al.
(Continued)

FOREIGN PATENT DOCUMENTS

WO  WO-2021181105 A1 * 9/2021 ............ F01D 15/10
WO     2022248798 A1   12/2022

OTHER PUBLICATIONS

Extended European Search Report for EP Application No. 24156633.0 dated Jun. 28, 2024, pp. 1-6.

*Primary Examiner* — Loren C Edwards
(74) *Attorney, Agent, or Firm* — CANTOR COLBURN LLP

(57) ABSTRACT

Aircraft engines include an engine housing, a core assembly arranged within the engine housing and comprising an engine shaft arranged axially within the engine housing extending in a forward-aftward direction, and a tail cone assembly attached to an aft end of the engine housing. The tail cone assembly includes a tail cone housing and an aircraft machine arranged within the tail cone housing the aircraft machine comprising a rotor shaft. An input shaft is configured between the engine shaft and the rotor shaft and a rotor coupling configured to sealing connect the rotor shaft and the input shaft, the rotor coupling configured to providing sealing engagement between the rotor shaft and the input shaft during at least one of relative axial displacement and relative radial displacement between the rotor shaft and the input shaft.

20 Claims, 10 Drawing Sheets

(56) References Cited

U.S. PATENT DOCUMENTS

| | | | |
|---|---|---|---|
| 2013/0014513 A1* | 1/2013 | Barnett | F02C 7/32 |
| | | | 60/802 |
| 2016/0149469 A1* | 5/2016 | Lemmers | F01D 25/12 |
| | | | 290/1 A |
| 2019/0085715 A1 | 3/2019 | Van Der Merwe et al. | |
| 2021/0119511 A1* | 4/2021 | Bloor | F16D 3/06 |
| 2022/0250760 A1 | 8/2022 | Wise et al. | |
| 2022/0251965 A1 | 8/2022 | Czarnik et al. | |
| 2022/0255401 A1* | 8/2022 | Czarnik | H02K 1/12 |

* cited by examiner

AIRCRAFT TAIL CONE MOUNTED GENERATORS

BACKGROUND

The subject matter disclosed herein generally relates to aircraft engines and associated systems and, more particularly, to tail cone mounted generators and features thereof.

Aircraft engines are often used to provide motive power to a vehicle (e.g., propulsion for flight of an aircraft). The aircraft engines may be mounted in a nacelle or in a body of the aircraft itself (e.g., wing or fuselage mounted engines). The aircraft engine typically includes a high-pressure spool having a high-pressure spool engine shaft and a low-pressure spool having a low-pressure engine shaft. The aircraft engine also includes an intake, typically including a fan or the like, and an exhaust supporting a nozzle and a tail cone. The tail cone helps channel exhaust gases through the nozzle to improve thrust performance.

Often times, in addition to providing power to the vehicle, the aircraft engine may be configured to generate electrical power, such as through inclusion and operation of a generator. The generator may provide power to various electrical systems in the aircraft. Generally, a high-pressure shaft includes a power take-off that is connected to a gear box. The gear box is then connected to one or more generators located in the body of the aircraft, or otherwise arranged separate from the engine. However, some generators have been directly installed or configurated with the engines, such as tail cone mounted generators. The tail cone mounted generators may be driven through or by a shaft of the engine (directly or through a gear box or the like). Further improvements on such tail cone mounted generators may be realized, as described herein.

BRIEF DESCRIPTION

According to some embodiments, aircraft engines include an engine housing, a core assembly arranged within the engine housing and comprising an engine shaft arranged axially within the engine housing extending in a forward-aftward direction, and a tail cone assembly attached to an aft end of the engine housing. The tail cone assembly includes a tail cone housing and an aircraft machine arranged within the tail cone housing the aircraft machine comprising a rotor shaft. An input shaft is configured between the engine shaft and the rotor shaft and a rotor coupling configured to sealing connect the rotor shaft and the input shaft, the rotor coupling configured to providing sealing engagement between the rotor shaft and the input shaft during at least one of relative axial displacement and relative radial displacement between the rotor shaft and the input shaft.

In addition to one or more of the features described herein, or as an alternative, further embodiments of the aircraft engines may include that the rotor coupling comprises an axial coupling portion configured to operably connect the rotor shaft to the input shaft and allow relative axial displacement between the input shaft and the rotor shaft while maintaining a sealing and rotational energy transfer from the input shaft to the rotor shaft.

In addition to one or more of the features described herein, or as an alternative, further embodiments of the aircraft engines may include that the axial coupling portion comprises a set of input spline teeth arranged on the input shaft and a set of rotor spline teeth on the rotor shaft, wherein the input spline teeth and the rotor spline teeth are engaged to transfer rotational energy from the input shaft to the rotor shaft.

In addition to one or more of the features described herein, or as an alternative, further embodiments of the aircraft engines may include a transfer tube arranged within the rotor shaft and configured to supply a working fluid therethrough, wherein the axial coupling portion comprises a stop member arranged at an aft end of the input shaft, the stop member sealingly engaged with the input shaft and having an orifice configured to direct the working fluid from the transfer tube into the input shaft.

In addition to one or more of the features described herein, or as an alternative, further embodiments of the aircraft engines may include that the stop member is arranged axially adjacent a rotor shaft land and an axial gap is defined between the stop member and the rotor shaft land, the axial gap selected to permit axial relative movement between the input shaft and the rotor shaft without contact.

In addition to one or more of the features described herein, or as an alternative, further embodiments of the aircraft engines may include that the axial gap is maintained, in part, by an axial biasing member arranged between the rotor shaft land and an input shaft land of the input shaft.

In addition to one or more of the features described herein, or as an alternative, further embodiments of the aircraft engines may include that the axial coupling portion comprises an axial biasing member arranged between the rotor shaft and the input shaft, the axial biasing member arranged to bias the input shaft in a forward direction.

In addition to one or more of the features described herein, or as an alternative, further embodiments of the aircraft engines may include that the input shaft comprises an input shaft land and the rotor shaft comprises a rotor shaft land and the axial biasing member is arranged between the input shaft land and the rotor shaft land.

In addition to one or more of the features described herein, or as an alternative, further embodiments of the aircraft engines may include that the rotor coupling comprises a radial coupling portion configured to operably connect the rotor shaft to the input shaft and allow relative radial displacement between the input shaft and the rotor shaft while maintaining a sealing and rotational energy transfer from the input shaft to the rotor shaft.

In addition to one or more of the features described herein, or as an alternative, further embodiments of the aircraft engines may include that the radial coupling portion comprises a ring seal arranged between an outer diameter surface of the input shaft and an inner diameter surface of the rotor shaft.

In addition to one or more of the features described herein, or as an alternative, further embodiments of the aircraft engines may include a set of seal shoulders extending radially from a surface of the input shaft and axially constraining the ring seal therebetween.

In addition to one or more of the features described herein, or as an alternative, further embodiments of the aircraft engines may include a retaining ring secured to the rotor shaft and arranged to contact one of the seal shoulders of the set of seal shoulders to axially constrain forward movement of the input shaft.

In addition to one or more of the features described herein, or as an alternative, further embodiments of the aircraft engines may include a dynamic seal arranged at a forward end of the rotor shaft and configured to rotationally seal between the rotor shaft and a fixed structure.

In addition to one or more of the features described herein, or as an alternative, further embodiments of the aircraft engines may include that the fixed structure is one of the tail cone housing, the engine housing, or a housing of the aircraft machine.

In addition to one or more of the features described herein, or as an alternative, further embodiments of the aircraft engines may include a ring seal arranged between an outer diameter surface of the input shaft and an inner diameter surface of the dynamic seal.

In addition to one or more of the features described herein, or as an alternative, further embodiments of the aircraft engines may include a set of seal shoulders extending radially from a surface of the input shaft and axially constraining the ring seal therebetween.

In addition to one or more of the features described herein, or as an alternative, further embodiments of the aircraft engines may include a stop shoulder arranged on a radially outward surface of the input shaft and a retaining ring fixedly connected to the rotor shaft. The stop should is configured to contact the retaining ring to limit axial displacement of the input shaft relative to the rotor shaft.

In addition to one or more of the features described herein, or as an alternative, further embodiments of the aircraft engines may include that the aircraft machine is an electric motor and the rotor shaft is a rotor of the electric motor and the aircraft machine comprises a stator arranged relative to the rotor.

In addition to one or more of the features described herein, or as an alternative, further embodiments of the aircraft engines may include that the aircraft machine is one of an electric motor, a pump, a turbine, and a compressor.

In addition to one or more of the features described herein, or as an alternative, further embodiments of the aircraft engines may include that rotor coupling includes an axial coupling portion configured to operably connect the rotor shaft to the input shaft and allow relative axial displacement between the input shaft and the rotor shaft while maintaining a sealing and rotational energy transfer from the input shaft to the rotor shaft and a radial coupling portion configured to operably connect the rotor shaft to the input shaft and allow relative radial displacement between the input shaft and the rotor shaft while maintaining a sealing and rotational energy transfer from the input shaft to the rotor shaft.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

It may be desirable to drive accessories (e.g., electric generators) off of a spool or shaft of an aircraft engine. Aircraft engines may be configured to drive accessories through a radial tower shaft and accessory gearbox operably connected to the spool or shaft. Aircraft engines also typically include a tail cone at the rear or aft end of the engine to help accelerate an exhaust flow and generate additional thrust. The enclosed area within this tail cone is typically empty space, and is also axially adjacent to the rotating shaft(s)/spool(s) of the engine. Embodiments disclosed herein seek to take advantage of this empty space by locating an electric generator within the tail cone and operably connecting the electric generator to an engine shaft such that the electric generator is driven by the engine shaft. The tail cone mounted electric generator may be configured to supply electricity to various other engine and/or aircraft systems.

Figure 1:
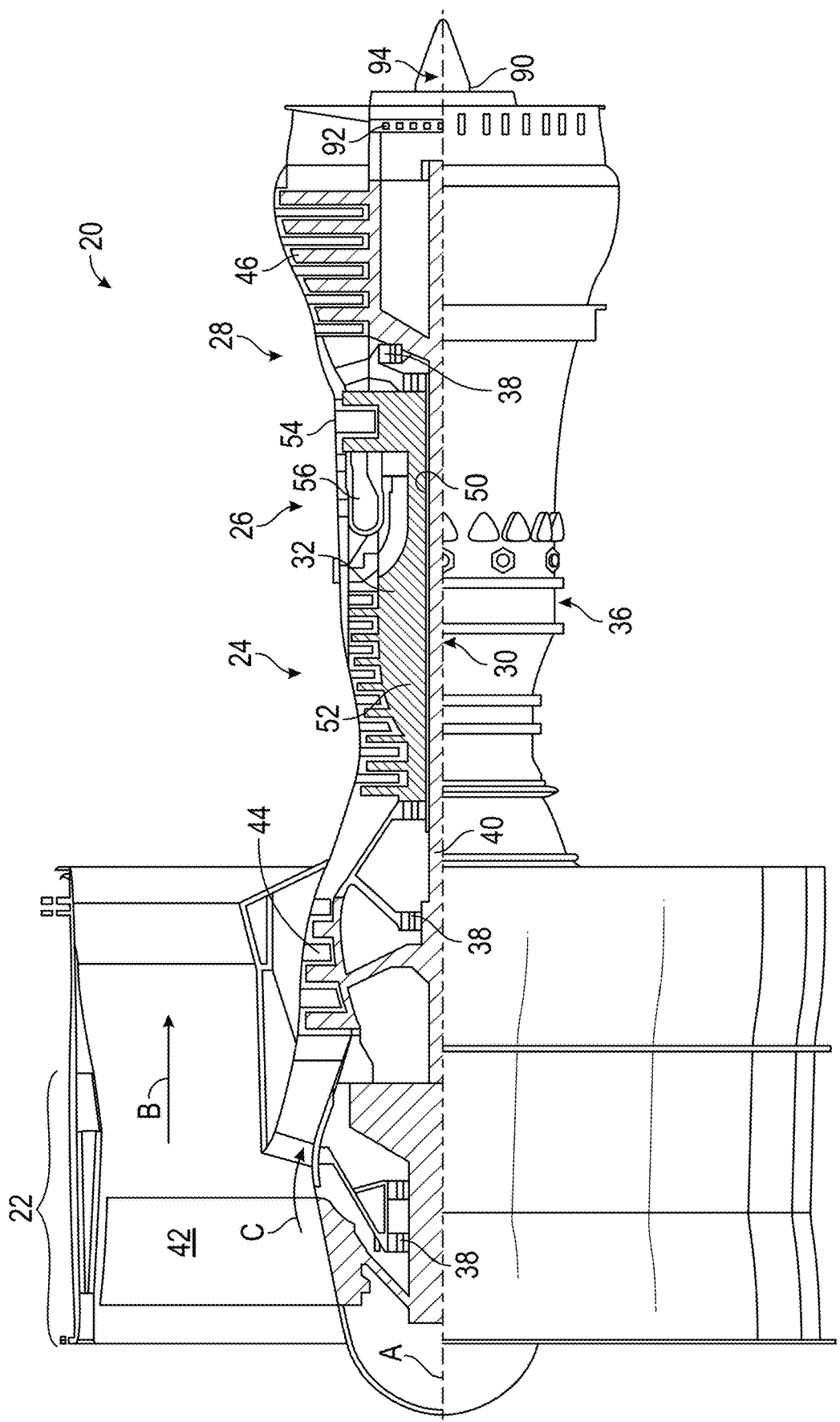
FIG. 1 is a schematic illustration of an aircraft engine including a tail cone mounted generator that may incorporate embodiments of the present disclosure.

FIG. 1 schematically illustrates an example aircraft engine 20 that may incorporate embodiments of the present disclosure. The illustrated example aircraft engine 20 includes a fan section 22, a compressor section 24, a combustor section 26, and a turbine section 28 axially arranged along an engine axis A. The fan section 22 is configured to drive a portion of air along a bypass flow path B in a bypass duct. The fan section 22 is also configured to direct a portion of air into a core assembly, and, for example, directs flow into the compressor section 24. The compressor section 24 is configured to drive air along a core flow path C for compression and communication into the combustor section 26, expansion through the turbine section 28, and exhausted out an aft end of the aircraft engine 20. Although not shown, the aircraft engine 20 may include a housing (e.g., nacelle) or the like.

The aircraft engine 20 includes a low speed spool 30 and a high speed spool 32 mounted for rotation about the engine axis A relative to an engine static structure 36 via several bearing systems 38. It should be understood that additional and/or alternative bearing systems, such as at various different locations, may be provided and the location of the bearing systems 38 may be varied as appropriate to the application.

The low speed spool 30, as shown, includes an inner shaft 40 that interconnects a fan 42 (of the fan section 22), a low pressure compressor 44 (of the compressor section 24), and a low pressure turbine 46 (of the turbine section 28). The fan 42 may be driven at a lower speed than the low speed spool 30. The high speed spool 32 includes an outer shaft 50 that interconnects a high pressure compressor 52 (of the compressor section 22) and a high pressure turbine 54 (of the turbine section 28). A combustor 56 is arranged in the gas turbine 20 between the high pressure compressor 52 and the high pressure turbine 54. The engine static structure 36 is arranged generally between the high pressure turbine 54 and the low pressure turbine 46. The engine static structure 36 is configured to support the bearing systems 38 in the turbine section 28. The inner shaft 40 and the outer shaft 50 are concentric and rotate via the bearing systems 38 about the engine axis A, which is collinear with the axes of the shafts 40, 50.

The air of the core flow path C is compressed by the low pressure compressor 44 then the high pressure compressor 52, mixed and burned with fuel in the combustor 56, then expanded over the high pressure turbine 54 and the low pressure turbine 46. The turbine section 28 rotationally drives the respective low speed spool 30 and high speed spool 32 in response to the expansion. It will be appreciated that each of the positions of the fan section 22, the compressor section 24, the combustor section 26, and the turbine section 28 may be varied, depending on the specific engine configuration and/or application.

As shown, the aircraft engine 20 includes a tail cone 90 located on a rear or aft portion of the aircraft engine 20. The tail cone 90 is operably shaped to help accelerate exhaust air exiting the core flow path C and configured to create additional thrust for the aircraft engine 20. Commonly, the tail cone 90 may be securely fastened to the aircraft engine 20 via a plurality of fasteners 92 and/or struts to one or more structural parts of the aircraft engine 20. The structural parts of the aircraft engine 20 to which the tail cone 90 may attach may be the engine static structure 36. The plurality of fasteners 92 may be arranged circumferentially around the engine axis A. The tail cone 90 may be securely fastened to the aircraft engine 20 in a cantilevered arrangement, as shown in FIG. 1. The tail cone 90 may include or define a hollow interior space 94 within the tail cone 90. Conventional gas turbine engines typically leave this interior space empty and unused. However, in accordance with embodiments disclosed herein, this interior space 94 may be utilized by locating an electric generator within the interior space 94.

When mounting the electric generator within the interior space of a tail cone, the connectors for the electric generator must enable connection from the generator to other engine and/or aircraft systems. Such electric generator may require fluid inputs (e.g., air and/or liquid) for the purpose of cooling and lubrication, including, for example, input and output conduits. Further, the electricity must be directed along electrical conductors to deliver the electricity to one or more desired locations (e.g., on the aircraft engine or elsewhere on the aircraft).

Figure 2A:
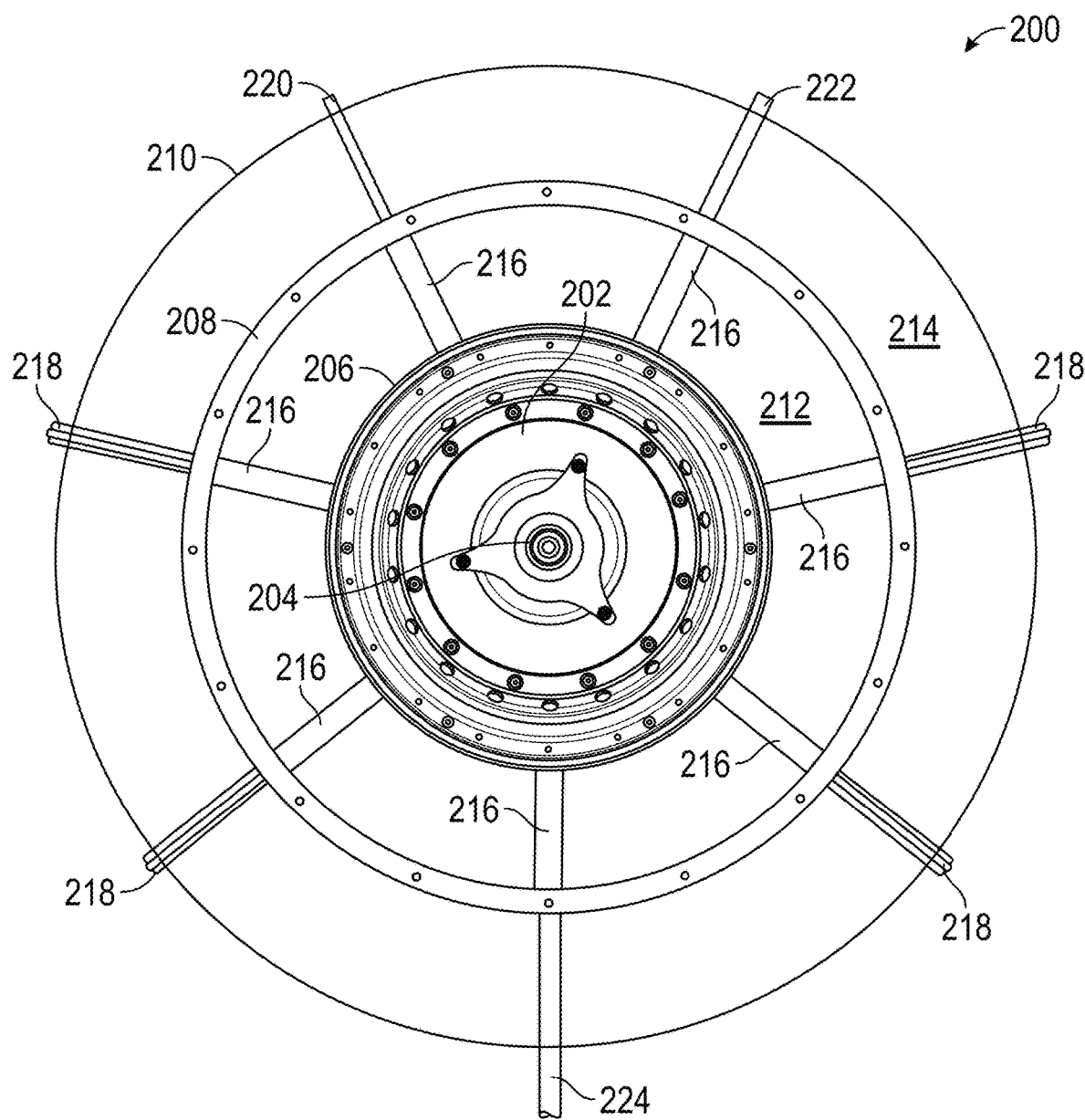
FIG. 2A is an aft-facing view of a tail cone assembly that may incorporate embodiments of the present disclosure.
Figure 2B:
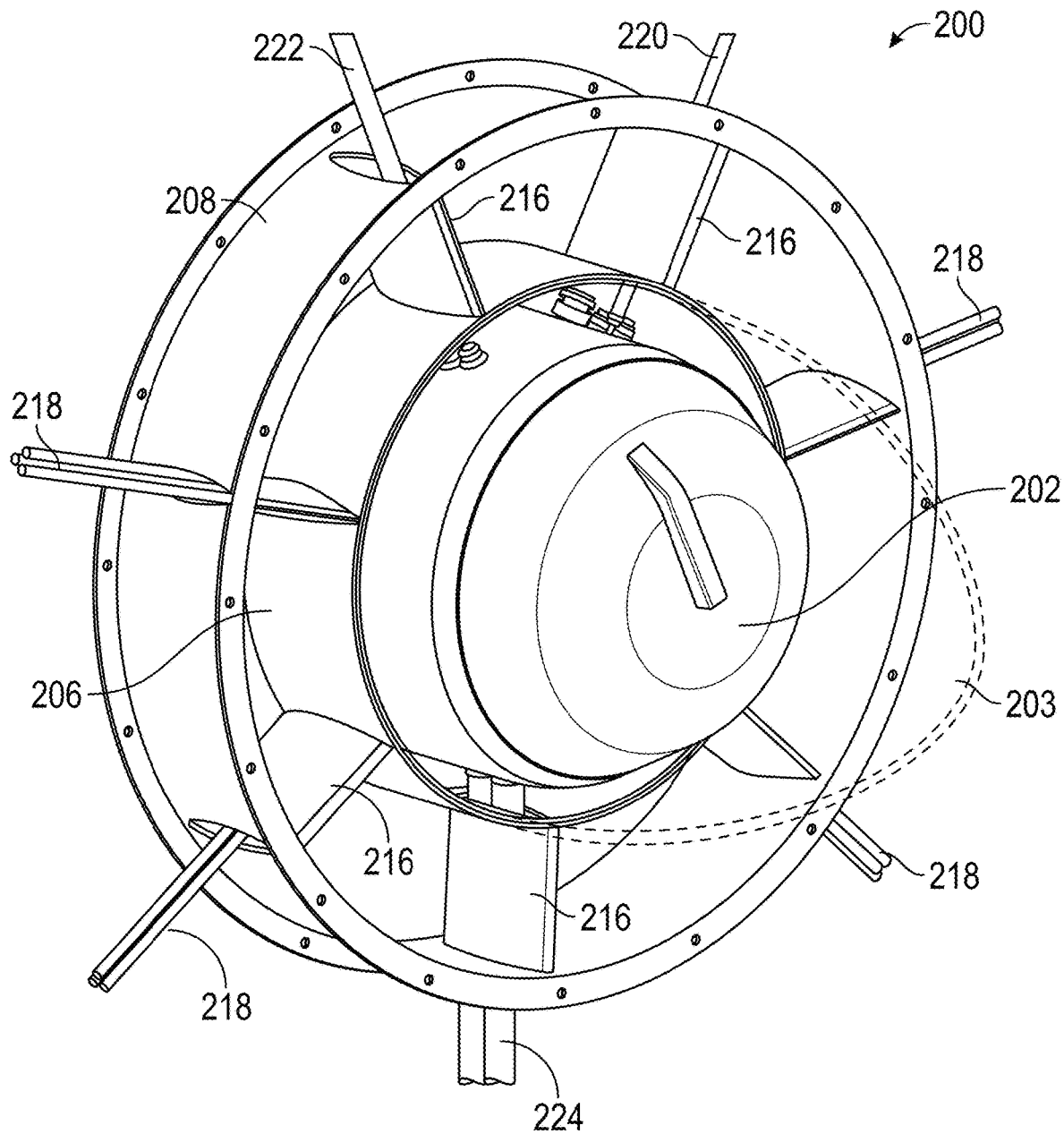
FIG. 2B is a perspective illustration of the tail cone assembly of FIG. 2A.
Figure 2C:
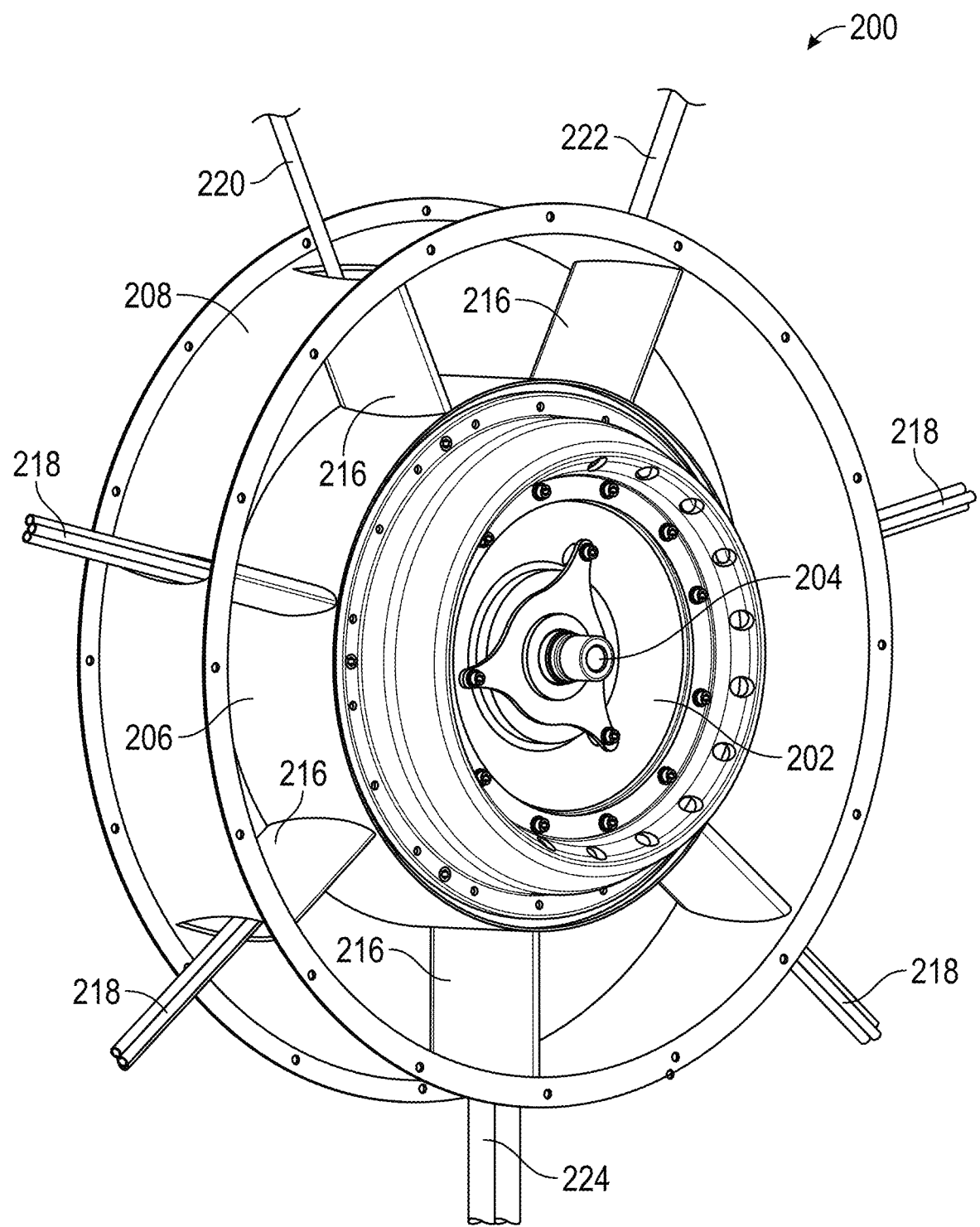
FIG. 2C a perspective illustration of the tail cone assembly of FIG. 2A with certain structures omitted for illustrative purposes.

Turning now to FIGS. 2A-2C, schematic illustrations of a tail cone assembly 200 that may incorporate embodiments of the present disclosure are shown. The tail cone assembly 200 includes an electric generator installed within a generator housing 202 that is arranged within a tail cone 203 and along an axis of an aircraft engine (e.g., as shown in FIG. 1). The electric generator may include an input shaft 204 that is configured to operably connect to an engine shaft of the aircraft engine. The shaft of the aircraft engine may be configured to drive operation of the electric generator to generate electrical power which may be distributed to other systems of the aircraft engine and/or of the aircraft.

The generator housing 202 is mounted within a first casing 206 of the aircraft engine. In this illustrative configuration, arranged radially outward from the first casing 206 is a second casing 208 and radially outward from the second casing 208 is a third casing 210. A space between the first casing 206 and the second casing 208 defines a core exhaust area 212 of a core flow path through the aircraft engine and a space between the second casing 208 and the third casing 210 defines a bypass exhaust area 214 of a bypass flow path. As shown, a plurality of struts 216 extend between the first casing 206 and the second casing 208. Although not show, a set of similarly configured struts may be provided between the second casing 208 and the third casing 210. In this configuration, the first casing 206 may be referred to as an inner casing, the second casing 208 may be referred to as a middle casing, and the third casing 310 may be referred to as an outer casing, with each description made relative to a radial line extending through an engine axis (e.g., engine axis A in FIG. 1).

The electric generator housed within the generator housing 202 may be operably connected to other systems using one or more types of conduits, cables, and/or connectors. For example, in this non-limiting example, the electric generator is configured with four sets of electrical conductors 218 operably (and electrically) connected thereto along with an oil input line 220, an air input line 222, and an oil scavenge line 224. As shown, the tail cone assembly 200 includes seven hollow struts 216. The hollow struts 216 are arranged circumferentially about or relative to the generator housing 202 at specific locations and aligned therewith. For example, as shown, four of the hollow struts 216 are configured to contain and protect the electrical conductors 218, one hollow strut 216 each is used to contain and protect the oil input line 220, the air input line 222, and the oil scavenge line 224. As such, each of the electrical conductors 218, the oil input line 220, the air input line 222, and the oil scavenge line 224 may pass through the core exhaust area 212 without being directly, and adversely, impacted thereby. Moreover, such elements are housed such that they are contained within substantially aerodynamic structures (i.e., the hollow struts 216), and thus do not adversely impact the exhaust stream efficiencies. The circumferential position or location of the hollow struts 216 allows for an easy installation of the internal components and ease of connection and/or interfacing with the generator housing 202 and/or elements/structures housed within the generator housing 202. This is achieved, in part, for example, due to a circumferential alignment of the hollow struts 216 with a connector on the generator housing 202.

It will be noted that in FIGS. 2A-2C, the electrical conductors 218, the oil input line 220, the air input line 222, and the oil scavenge line 224 pass through the bypass exhaust area 214. However, this configuration is not to be limiting. For example, due to the lower temperatures within the bypass exhaust area 214, it may be possible to run one or more of the electrical conductors 218, the oil input line 220, the air input line 222, and/or the oil scavenge line 224 along an exterior or outer diameter surface of the second casing 208 (e.g., a surface facing the third casing 210). Such configuration may have one or more of the electrical conductors 218, the oil input line 220, the air input line 222, and the oil scavenge line 224 extending axially along the second casing 208 (i.e., in-and-out of the page of FIG. 2A). As such, the illustrative configuration is not to be limiting, but rather is merely for illustrative and explanatory purposes.

Figure 3:
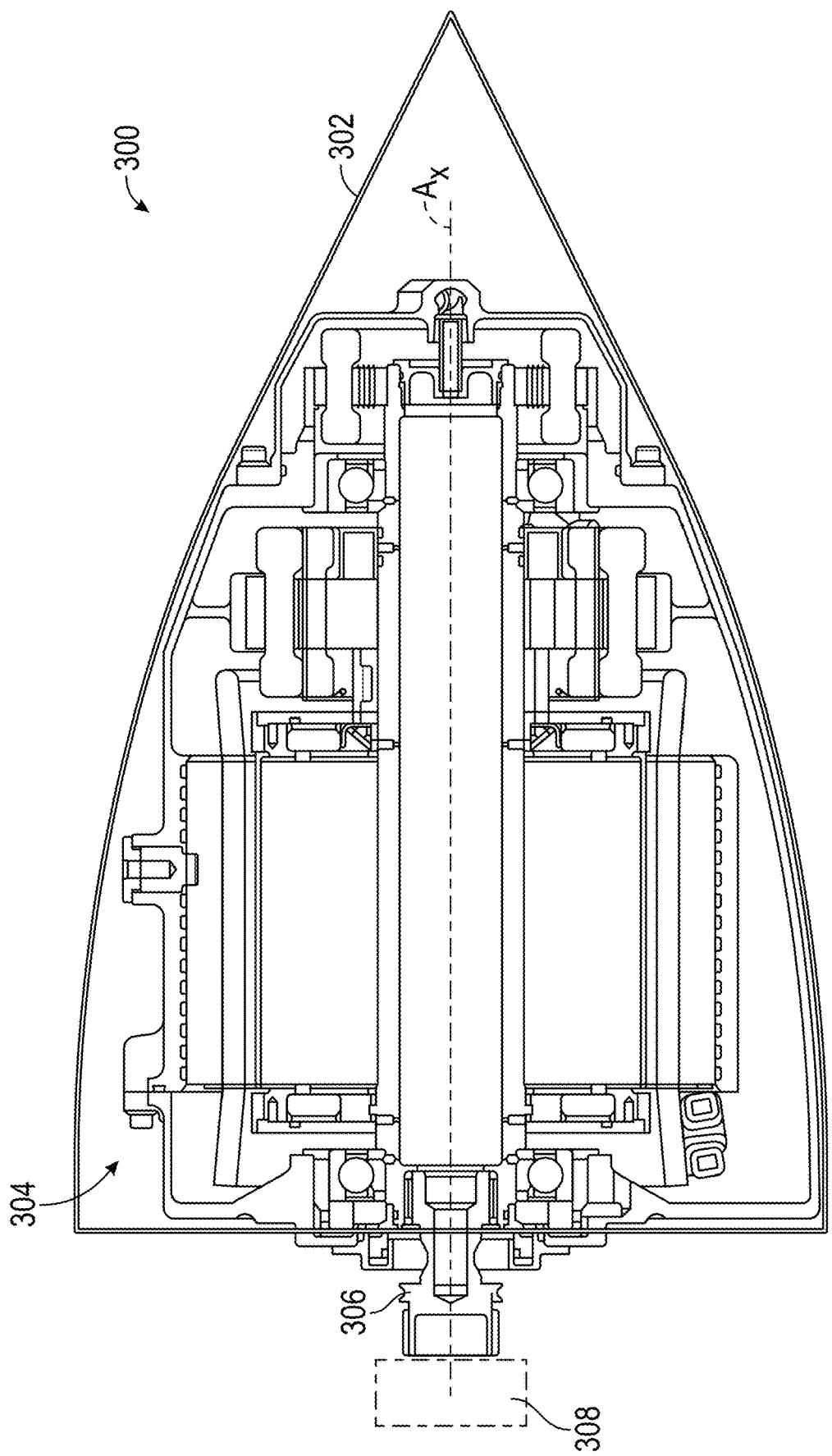
FIG. 3 is a schematic cross-sectional illustration of a tail cone assembly that may incorporate embodiments of the present disclosure.

Turning now to FIG. 3, a schematic cross-sectional illustration of a tail cone assembly 300 that may incorporate embodiments of the present disclosure is shown. FIG. 3 illustrates a generator housing 302 with an electric generator 304 installed therein. The electric generator 304 includes an input shaft 306 that operably connects to an engine shaft 308 of an aircraft engine and is arranged along a longitudinal axis $A_x$ of the generator housing 302. When installed within an aircraft engine, the longitudinal axis $A_x$ of the generator housing 302 will align with the engine axis (e.g., engine axis A of FIG. 1).

Tail cone mounted generators may be exposed, directly or indirectly, to the exhaust gases from the aircraft engine. As such, the tail cone mounted generators may be subject to ambient and operating temperatures that may create unique installation and/or operational impacts. For example, a thermal temperature gradient along the engine axial length as compared to an engine shaft creates a situation where accessories mounted inline have to accommodate a large axial expansion of an associated drive coupler. Torque and friction in the coupler result in potential large axial loads driven into accessory bearings. The engine thermal gradient and material combinations also combine to net radial misalignment. In view of this, and other considerations, embodiments of the present disclosure are directed to providing a means or mechanism for an oil lube spline internal to the tail cone mounted electric generator to provide a sliding surface as the engine heats up and thermally stabilizes. This, in combination with a light axial spring, may ensure a generator-to-engine coupling does not have to accommodate the axial growth. In accordance with some embodiments, by separating a dynamic seal mating ring from an input shaft can isolate the dynamic seal from axial growth and radial misalignment. This separation may require a sealing scheme between the input shaft and generator rotor shaft, which is provided in accordance with some embodiments of the present disclosure.

Figure 4:
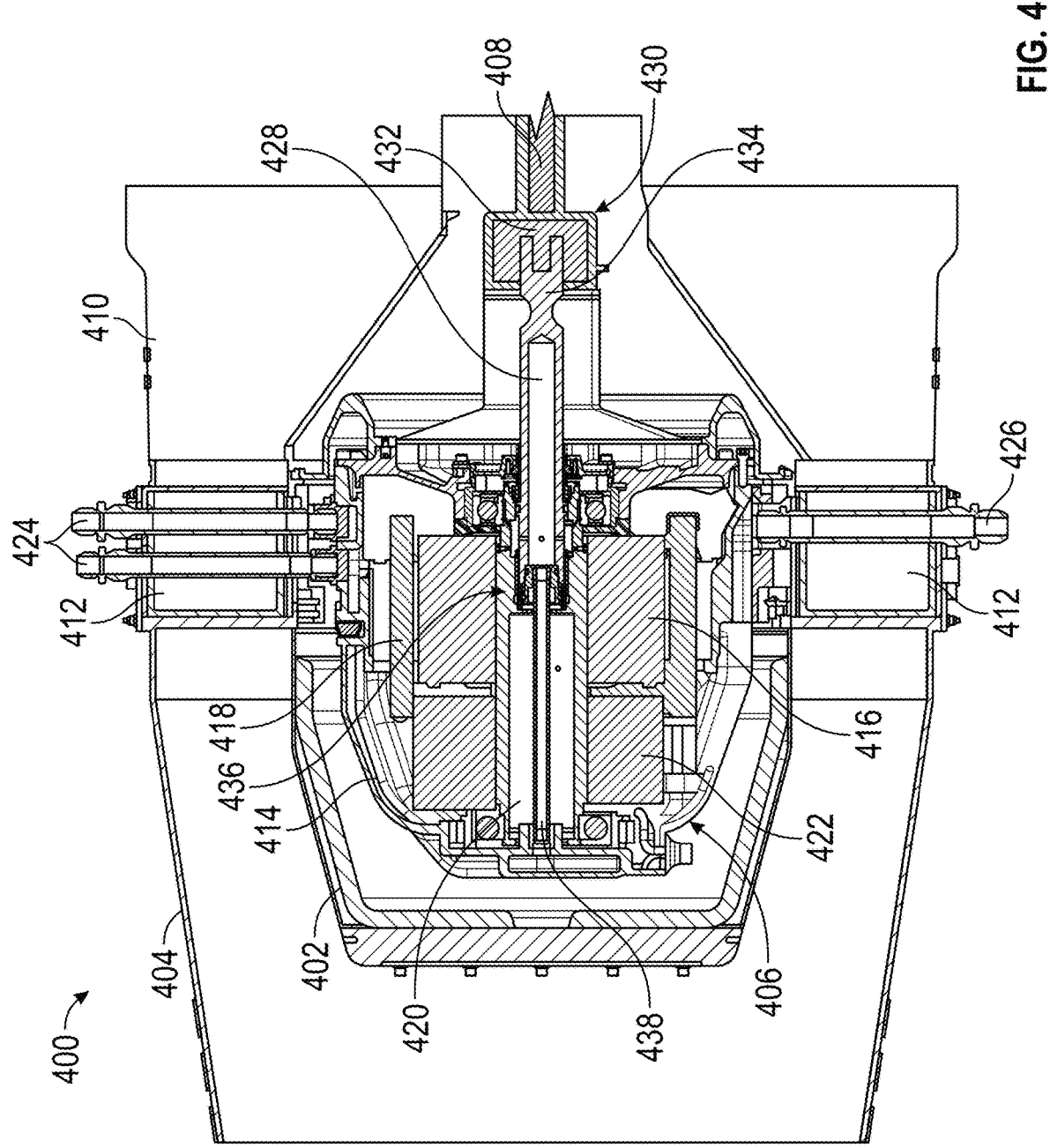
FIG. 4 is a schematic illustration of a tail cone assembly in accordance with an embodiment of the present disclosure.

Referring now to FIG. 4, a schematic illustration of a tail cone assembly 400 in accordance with an embodiment of the present disclosure is shown. The tail cone assembly 400 may be mounted to an aircraft engine. The tail cone assembly 400 includes a tail cone housing 402 arranged within a nozzle 404 of the aircraft engine. A generator 406 is arranged within the tail cone housing 402 and is operably coupled or connected to an engine shaft 408. The engine shaft 408 may be a high speed or low speed spool or shaft of an aircraft engine. The tail cone housing 402 may be supported within or to the nozzle 404 or with or to an engine structure 410 by one or more struts 412. The generator 406 includes a generator housing 414 that houses components of the generator 406, as described herein.

The generator 406 includes a rotor 416 and a stator 418 arranged to generate electricity. For example, the rotor 416 may be rotationally mounted on, attached to, or part of a rotor shaft 420. The stator 418 is arranged radially outward from the rotor 416 and is configured to have a current induced therein by rotation of the rotor 416. In this illustrative configuration, the generator 406 includes an exciter 422 arranged in functional operation with the rotor shaft 420 (e.g., for startup or the like). The components of the generator 406 may be cooled and/or lubricated by fluids (e.g., oil) and/or gases (e.g., air) provided from one or more respective input conduits 424, and may be extracted therefrom through one or more outlet conduits 426.

The rotor shaft 420 may be coupled to an input shaft 428. The input shaft 428 may be operably coupled to the engine shaft 408 by a drive coupling 430. The drive coupling 430 may include an engine portion 432 and a drive shaft portion 434. The drive coupling 430 may include gearing or the like for changing a rotational speed from the engine shaft 408 to a rotational speed selected for operation of the generator 406. The drive shaft portion 434 of the drive coupling 430 may define an end of the input shaft 428. At an opposite end of the input shaft 428 is a rotor coupling 436. The rotor coupling 436 is configured to couple the drive shaft 428 to the rotor shaft 420 and thus input rotational energy from the engine shaft 408 to the rotor shaft 420 through the drive shaft 428. As shown, a transfer tube 438 may be arranged within the rotor shaft 420. The transfer tube 438 may be fluidly coupled to one of the input conduits 424 to supply a cooling fluid (e.g., oil) into the rotor shaft 420 to provide cooling and lubrication to the rotor shaft 420, the exciter 422, the rotor 416, the stator 418, and/or other components of the generator 406.

In accordance with embodiments of the present disclosure, rotor coupling 436 is provided in a configuration to permit axial and/or radial adjustments, deflections, or the like that are experienced during operation of the aircraft engine. One such impact is thermal expansion and contraction of various components and structure of the aircraft engine. The drive coupling 430 and/or the rotor coupling 436 are configured to accommodate such changes, expansions, contractions, misalignments, and the like. In accordance with embodiments of the present disclosure, the rotor coupling 436 is configured with mechanisms and features to permit axial and/or radial misalignment. For example, due to thermal gradients experienced by different components of the aircraft engine, the rotor coupling 436 may be subject to misalignments of about 50 thousandths of an inch offset compared to the drive coupling 430.

Although FIG. 4 is described with the generator 406 arranged within the tail cone housing 402, such system is not intended to be limiting. For example, in other embodiments, other mechanical systems may be arranged within the tail cone housing 402. In one such example, the components with the tail cone housing 402 may be a pump that is powered by the rotationally energy input from the engine shaft 408. In other embodiments, the system installed within the tail cone housing 402 may be a permanent magnet system, an induction motor, a turbine, a compressor, or other system that is configured to convert rotational energy received from the engine shaft 408 into work and/or power (e.g., electrical power, mechanical power, etc.). As such, a generator within the tail cone assembly is not intended to be limiting to the present disclosure, but rather is one non-limiting example implementation.

Figure 5A:
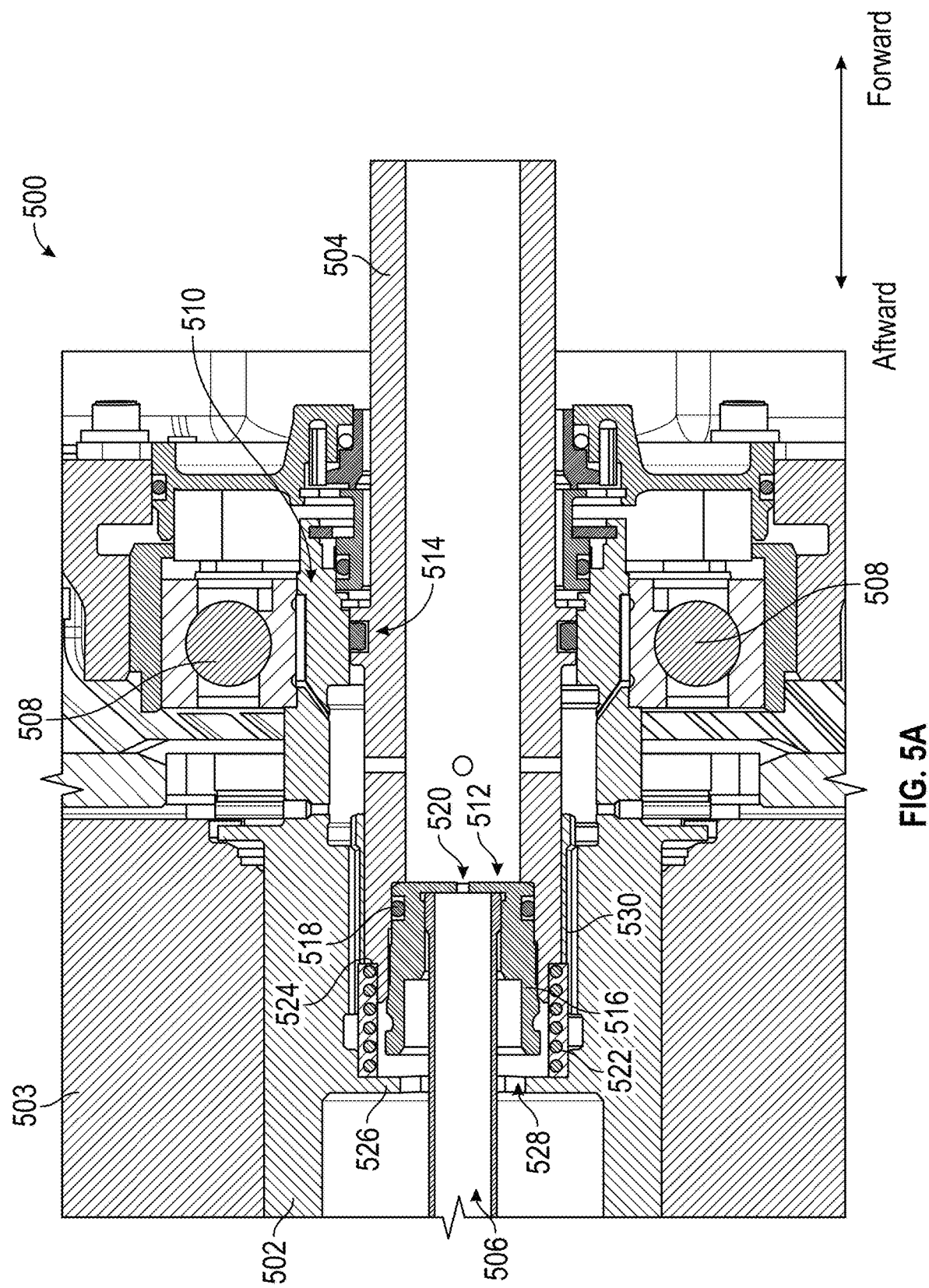
FIG. 5A is a schematic illustration of a rotor coupling for a tail cone assembly in accordance with an embodiment of the present disclosure.
Figure 5B:
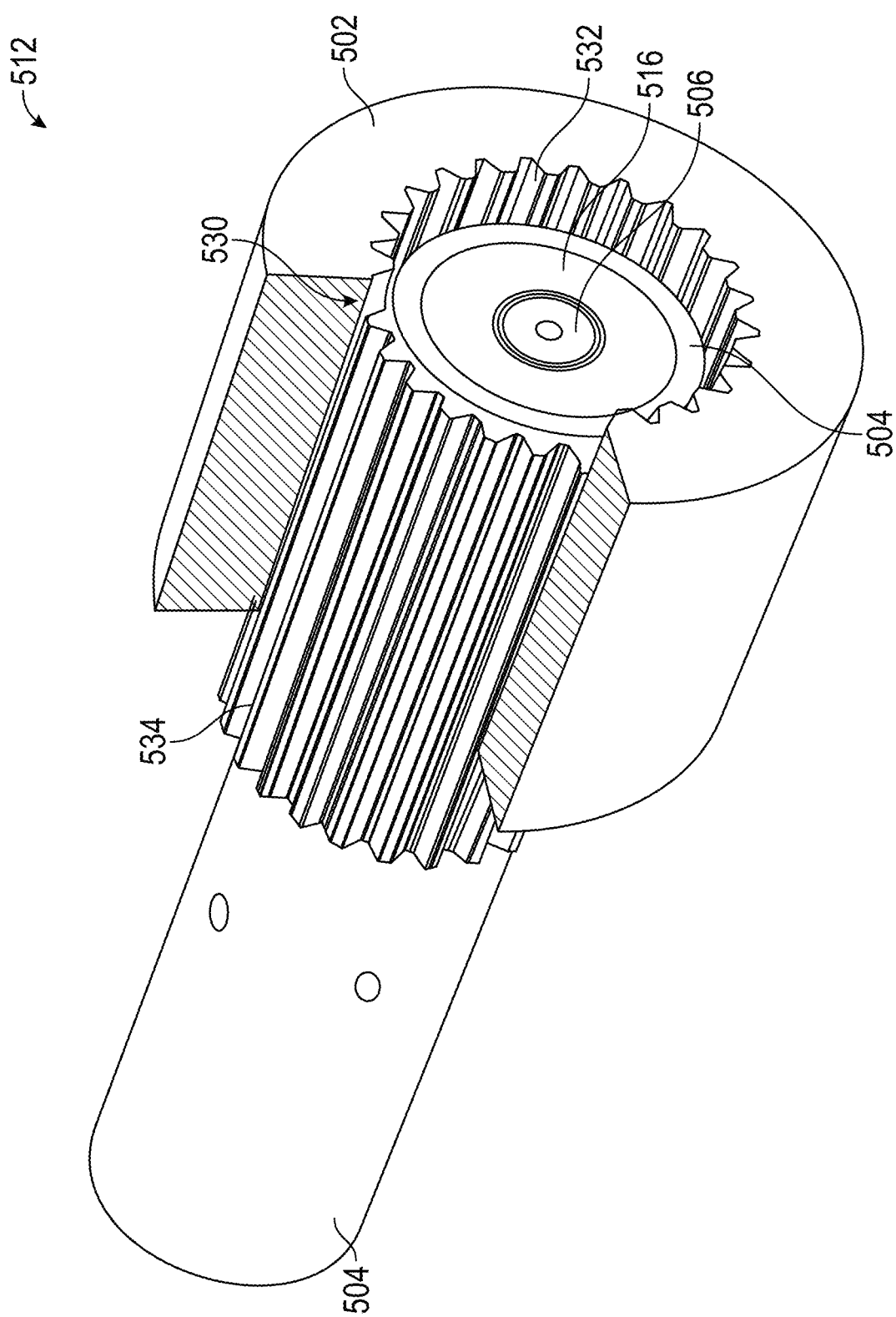
FIG. 5B is a schematic illustration of an axial coupling portion of the rotor coupling of FIG. 5A.
Figure 5C:
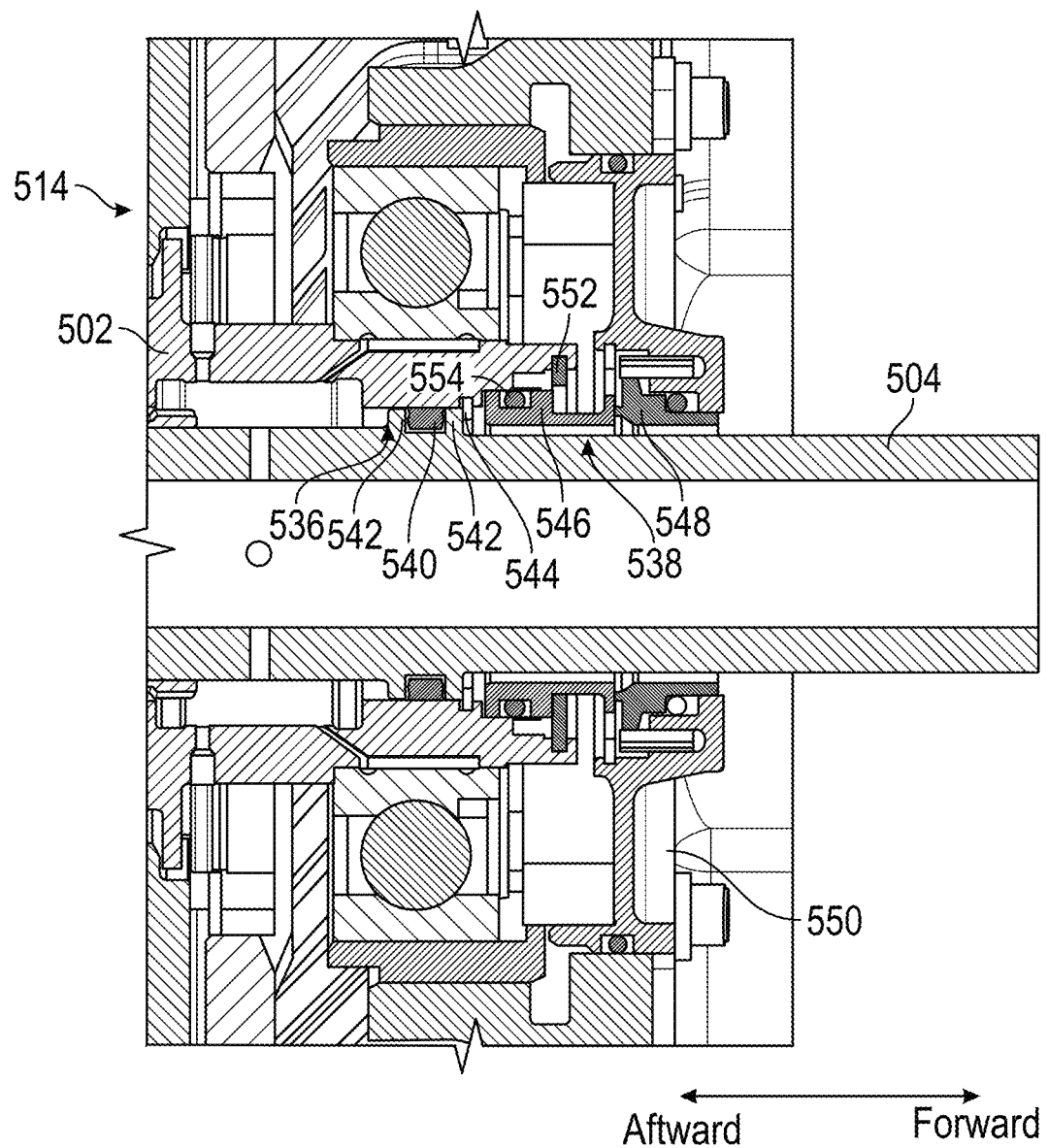
FIG. 5C is a schematic illustration of a radial coupling portion of the rotor coupling of FIG. 5A.

Referring now to FIGS. 5A-5C, schematic illustrations of a portion of a tail cone assembly 500 in accordance with an embodiment of the present disclosure are shown. The tail cone assembly 500 may be part of an aircraft engine, and the tail cone assembly 500 may be operably coupled with a shaft of the aircraft engine, as described above. The tail cone assembly 500 includes a rotor shaft 502 that is configured to be rotationally driven by an input shaft 504. The input shaft 504 may be coupled to an engine shaft, such as shown and described above with respect to FIG. 4. The rotor shaft 502 may be part of an aircraft machine, such as an electric motor, and electric generator, a pump, a compressor, a turbine, or other machine configured to convert rotational energy into work or power. As shown, the rotor shaft 502 may be coupled to and configured to rotationally drive an aircraft machine component 503, which may be a rotating part of the aircraft machine (e.g., rotor magnets in an electric machine, a pump impeller, a turbine, a compressor, or the like).

FIG. 5A illustrates a schematic diagram of a rotor coupling 510 between the input shaft 504 and the rotor shaft 502. A transfer tube 506, in this configuration, is arranged within the rotor shaft 502 and configured to receive and direct working fluid (e.g., a cooling and/or lubricating fluid, such as oil) into the rotor shaft 502 and into the input shaft 504 through one or more apertures. The cooling fluid may be then directed along and/or through various fluid paths and cavities to provide cooling and/or lubrication to various parts of the tail cone assembly 500. For example, the rotor shaft 502 may be supported on one or more bearings 508 which may receive the cooling fluid as a cooling medium and lubrication.

FIGS. 5A-5C illustrate aspects of the rotor coupling 510 which couples or operably connects the rotor shaft 502 and the input shaft 504 of the tail cone assembly 500. The rotor coupling 510 includes an axial coupling portion 512 and a radial coupling portion 514. The axial coupling portion 512 is configured to accommodate relative axial movement or axial displacement between the rotor shaft 502 and the input shaft 504 while maintaining the connection therebetween. The radial coupling portion 514 is configured to accommodate relative radial displacement of the rotor shaft 502 and the input shaft 504 while maintaining the connection therebetween.

As shown in FIGS. 5A-5B, the axial coupling portion 512 includes a stop member 516 arranged within an aft end of the input shaft 504. The stop member 516 may be sealingly engaged and installed at the aft end of the input shaft 504 within one or more stop member seals 518. The stop member 516 is configured to extend from the aft end of the input shaft 504 and includes an orifice 520 for directing the working fluid from the transfer tube 506 into the input shaft 504. In this configuration, an outer surface of the stop member 516 sealingly engages with an inner surface of the input shaft 504 by, in this configuration, the stop member seal(s) 518. The transfer tube 506 is configured to engage with and be supported by the stop member 516. In this configuration, a forward end of the transfer tube 506 is fit within and supported by the stop member 516.

The axial coupling portion 512 also includes an axial biasing member 522. The axial biasing member 522 in configured to apply an axial biasing force between the input shaft 504 and the rotor shaft 502. As such, the axial biasing member 522 is arranged about an aft end of the input shaft 502, such as on an input shaft land 524, and at an opposite end of the axial biasing member 522, the axial biasing member is arranged on a rotor shaft land 526 at a forward end region of the rotor shaft 502. In such a configuration, the axial biasing member 522 is configured to compress and/or expand in an axial direction between the input shaft land 524 and the rotor shaft land 526. The axial biasing member 522 may be a spring or the like. In some configuration, the axial biasing member 522 may be generally biased in a direction toward the input shaft 504 (i.e., a forward direction FIG. 5A). The axial biasing member 522 is configured to maintain, at least partially, an axial gap 528 between the stop member 516 and the rotor shaft 502, and particularly between the stop member 516 and the rotor shaft land 526. The axial gap 528 permits relative axial displacement between the rotor shaft 502 and the input shaft 504.

The axial coupling portion 512 is configured to ensure transmission of rotationally energy from the input shaft 504 into the rotor shaft 502. Accordingly, a spline connection 530 is provided at the engagement between the rotor shaft 502 and the input shaft 504. As shown in FIG. 5B, the spline connection 530 comprises a set of rotor spline teeth 532 arranged on an interior or radially inward surface of a portion of the rotor shaft 502. The input shaft 504 includes a corresponding set of input spline teeth 534 on an exterior or radially outward surface of a portion of the input shaft 504. An axial length of the rotor spline teeth 532 and the input spline teeth 534 is selected to ensure that the spline connection 530 remains mated and capable of transferring rotational energy from the input shaft 504 to the rotor shaft 502 even when there is axial displacement between the rotor shaft 502 and the input shaft 504. For example, in one non-limiting example of such a configuration, the spline teeth 532, 534 may be between 0.8 and 1.2 inches (e.g., 0.97 inch), and the spline teeth 532, 534 may be staggered approximately between 0.1 and 0.3 inches (e.g., 0.21 inch) when the biasing member 522 is applying a spring force on the input shaft 504.

The rotor coupling 510 further includes the radial coupling portion 514, with an enlarged detailed illustration of the radial coupling portion 514 shown in FIG. 5C. The radial coupling portion 514 is configured to permit relative radial offset or displacement between the rotor shaft 502 and the input shaft 504. The radial coupling portion comprises a first seal assembly 536 and a second seal assembly 538. The seal assemblies 536, 538 are configured to provide sealing engagement between the rotor shaft 502 and the input shaft 504.

The first seal assembly 536, in this configuration, comprises a first ring seal 540 that is arranged on an exterior or radially outward surface of the input shaft 504 and on an interior or radially inward surface of the rotor shaft 502, and provides sealing engagement therebetween. The first ring seal 540 is arranged at a fixed axial position on the input shaft 504 and is configured, in this embodiment, to axially slide along the interior or radially inward surface of the rotor shaft 502 and maintain sealing engagement during such axial movement. The first ring seal 540 is maintained in axial position on the input shaft 504 between a set of seal shoulders 542.

In this configuration, the input shaft 504 is axially constrained in a forward direction by a first retaining ring 544. The first retaining ring 544 is positioned such that as the axial biasing member 522 pushes or urges the input shaft 504 in the forward direction the axial movement of the input shaft 504 is limited. Such axial movement limitation provided by the first retaining ring 544 may ensure that the spline connection 530 does not become disconnected or unseated. As shown, in this example configuration, the first retaining ring 544 may be arranged to abut one of the seal shoulders 542 (e.g., a forward located seal shoulder 542). It will be appreciated that the seal shoulders 542 may be arranged to extend radially inward from the rotor shaft 502, and retain the first ring seal 540 therebetween. However, in such embodiments, the seal shoulders may not be able to axially limit movement of the input shaft 504 relative to the rotor shaft 502, and thus a separate radial shoulder may be provided relative to a retaining ring to axially limit movement of the input shaft 504 relative to the rotor shaft 502.

The second seal assembly 538 includes a dynamic seal 546 that is secured at a forward end of the rotor shaft 502. The dynamic seal 546 is configured to seal with a housing seal 548 that is fixedly attached to a fixed structure 550 (e.g., aircraft machine housing, engine housing, tail cone housing, or the like). The dynamic seal 546 is configured to rotate with rotation of the rotor shaft 502 and sealingly engage with the housing seal 548 during such rotation. The dynamic seal 546 is held in place by a second retaining ring 552. The second retaining ring 552 axially secures the dynamic seal 546 to a forward end of the rotor shaft 502. A second ring seal 554 may provide a seal between the dynamic seal 546 and an inner or radially inward surface of the forward end of the rotor shaft 502. In accordance with this illustrative embodiment, the combination of the first ring seal 540 and the dynamic seal 546, and the associated components, provides for sealing engagement between the rotor shaft 502 and the input shaft 504, even during radial displacement of the rotor shaft 502 relative to the input shaft 504.

In this illustrative configuration, the first seal assembly 536 and a second seal assembly 538 are axially offset from each other. However, such an offset is not required in accordance with embodiments of the present disclosure.

Figure 6:
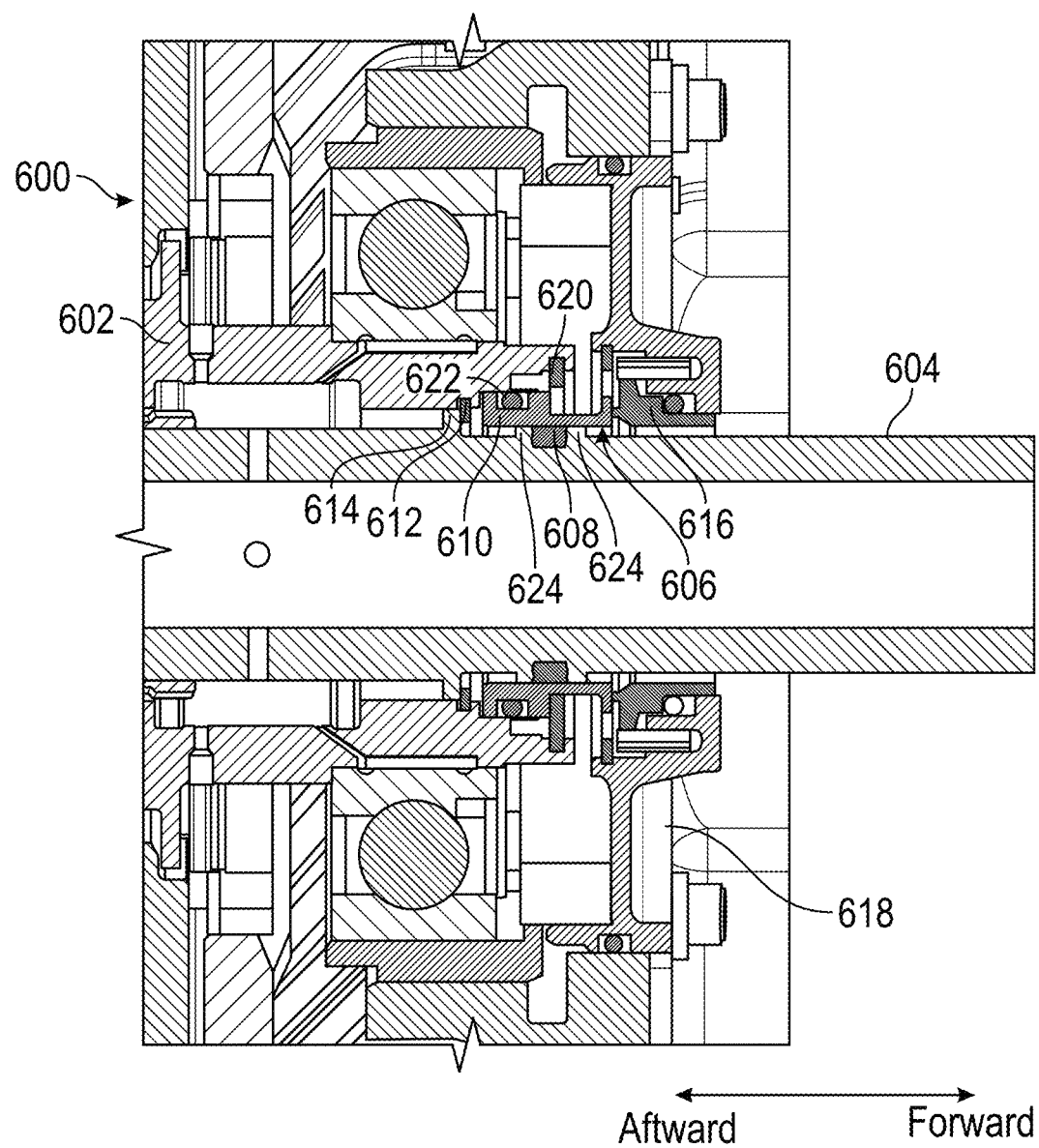
FIG. 6 is a schematic illustration of a radial coupling portion in accordance with an embodiment of the present disclosure.

For example, referring now to FIG. 6, a schematic illustration of a radial coupling portion 600 that is part of a rotor coupling between a rotor shaft 602 and an input shaft 604 is shown. In this configuration, the first seal assembly and the second seal assembly, described with respect to FIGS. 5A-5C, are combined into a single seal assembly 606. The seal assembly 606 of the radial coupling portion is arranged at an aft end of the input shaft 604 and a forward end of the rotor shaft 602, and is arranged forward of an axial coupling portion, as described above. Similar to the configuration of FIGS. 5A-5C, the radial coupling portion 600 includes a first ring seal 608 and a dynamic seal 610. Further, similar to the prior configuration, the axial movement of the input shaft 604 is axially constrained by a first retaining ring 612, which is configured to axially stop forward movement of the input shaft 604 relative to the rotor shaft 602 by contacting a stop shoulder 614. The dynamic seal 610 is configured to axially engage with a housing seal 616 that is part of or installed to a fixed structure 618 (e.g., aircraft machine housing, tail cone housing, engine housing, etc.). As second retaining ring 620 is provided to secure the dynamic seal 610 to the forward end of the rotor shaft 602, and a second ring seal 622 may be provided to seal between the dynamic seal 610 and an inner or radially inward surface of the rotor shaft 602.

In this configuration, the first ring seal 608 is axially held in place between a set of seal shoulders 624. The axial position of the seal shoulders 624 at the aft end of the input shaft 604 is set to align with the dynamic seal 610. As such, the first ring seal 608 may provide sealing engagement between an outer or radially outward surface of the input shaft 604 and an inner or radially inward surface of the dynamic seal 610. The configuration of FIG. 6 provides similar radial displacement sealing between the rotor shaft 602 and the input shaft 604.

In accordance with embodiments of the present disclosure, the rotor couplings may provide for sealing engagement to accommodate thermal axial growth (e.g., axial coupling portion) and/or radial growth or displacement (e.g., radial coupling portion). In accordance with some non-limiting examples and without limitation, the axial coupling portion may provide for up to 0.1 to 0.2 inch (e.g., 0.125 inch) of relative axial displacement between a rotor shaft and an input shaft of the system. Similarly, the radial coupling portion may be provide for up to 50 thousandths of an inch in radial offset between the rotor shaft and the input shaft, without negatively impacting the operation of the system.

Advantageously, embodiments of the present disclosure provide for improved connections between an input shaft and a rotor shaft of an aircraft machine. Such configurations allow for a rotor shaft of the aircraft machine to be rotationally driven by an engine shaft of an aircraft engine, and further permits at least one of axial and radial displacement between a rotor shaft and an input shaft. Such displacements may occur during rotation and torque transfer or rotational energy transfer between an input shaft and a rotor shaft. Moreover, various relative displacements may occur due to thermal changes during operation. The rotor couplings of the present disclosure may include axial and/or radial coupling portions. In some embodiments, only a radial coupling portion may be provided or only a radial coupling portion may be provided. In other embodiments, both radial and axial coupling portions may be provided.

In accordance with embodiments of the present disclosure, an oil-lube spline arranged internal to the aircraft machine is provided to allow sliding surfaces to remain mated (e.g., axial displacement) as the aircraft engine heats up and thermally stabilizes. In accordance with some embodiments, such axial sealing and displacement accommodation may be made in combination with an axial axial biasing member to ensure the axial coupling portion does not have to accommodate the axial growth, but rather such axial growth (and shrinkage) may be accommodated by the axial biasing member. Further, separating a dynamic seal mating ring from the input shaft may isolates the dynamic seal from axial growth and radial misalignment.

As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. An aircraft engine comprising:
an engine housing;

a core assembly arranged within the engine housing and comprising an engine shaft arranged axially within the engine housing extending in a forward-aftward direction;

a tail cone assembly attached to an aft end of the engine housing, the tail cone assembly comprising:
  a tail cone housing; and
  an aircraft machine arranged within the tail cone housing, the aircraft machine comprising a rotor shaft;
  an input shaft configured between the engine shaft and the rotor shaft;
  a rotor coupling configured to sealing connect the rotor shaft and the input shaft, the rotor coupling configured to provide sealing engagement between the rotor shaft and the input shaft during at least one of relative axial displacement and relative radial displacement between the rotor shaft and the input shaft, wherein the rotor coupling comprises an axial coupling portion configured to operably connect the rotor shaft to the input shaft and allow relative axial displacement between the input shaft and the rotor shaft while maintaining a sealing and a rotational energy transfer from the input shaft to the rotor shaft, and
  a transfer tube arranged within the rotor shaft and configured to supply a working fluid therethrough, wherein the axial coupling portion comprises a stop member arranged at an aft end of the input shaft, the stop member sealingly engaged with the input shaft and having an orifice configured to direct the working fluid from the transfer tube into the input shaft.

2. The aircraft engine according to claim 1, wherein the axial coupling portion comprises a set of input spline teeth arranged on the input shaft and a set of rotor spline teeth on the rotor shaft, wherein the input spline teeth and the rotor spline teeth are engaged to transfer rotational energy from the input shaft to the rotor shaft.

3. The aircraft engine according to claim 1, wherein the stop member is arranged axially adjacent a rotor shaft land and an axial gap is defined between the stop member and the rotor shaft land, the axial gap selected to permit axial relative movement between the input shaft and the rotor shaft without contact.

4. The aircraft engine according to claim 3, wherein the axial gap is maintained, in part, by an axial biasing member arranged between the rotor shaft land and an input shaft land of the input shaft.

5. The aircraft engine according to claim 1, wherein the axial coupling portion comprises an axial biasing member arranged between the rotor shaft and the input shaft, the axial biasing member arranged to bias the input shaft in a forward direction.

6. The aircraft engine according to claim 5, wherein the input shaft comprises an input shaft land and the rotor shaft comprises a rotor shaft land and the axial biasing member is arranged between the input shaft land and the rotor shaft land.

7. The aircraft engine according to claim 1, wherein the rotor coupling comprises a radial coupling portion configured to operably connect the rotor shaft to the input shaft and allow relative radial displacement between the input shaft and the rotor shaft while maintaining a sealing and a rotational energy transfer from the input shaft to the rotor shaft.

8. The aircraft engine according to claim 7, wherein the radial coupling portion comprises a ring seal arranged between an outer diameter surface of the input shaft and an inner diameter surface of the rotor shaft.

9. The aircraft engine according to claim 8, further comprising a set of seal shoulders extending radially from a surface of the input shaft and axially constraining the ring seal therebetween.

10. The aircraft engine according to claim 9, further comprising a retaining ring secured to the rotor shaft and arranged to contact one of the seal shoulders of the set of seal shoulders to axially constrain forward movement of the input shaft.

11. The aircraft engine according to claim 7, further comprising a dynamic seal arranged at a forward end of the rotor shaft and configured to rotationally seal between the rotor shaft and a fixed structure.

12. The aircraft engine according to claim 11, wherein the fixed structure is one of the tail cone housing, the engine housing, or a housing of the aircraft machine.

13. The aircraft engine according to claim 11, further comprising a ring seal arranged between an outer diameter surface of the input shaft and an inner diameter surface of the dynamic seal.

14. The aircraft engine according to claim 13, further comprising a set of seal shoulders extending radially from a surface of the input shaft and axially constraining the ring seal therebetween.

15. The aircraft engine according to claim 13, further comprising:
  a stop shoulder arranged on a radially outward surface of the input shaft; and
  a retaining ring fixedly connected to the rotor shaft,
  wherein the stop shoulder is configured to contact the retaining ring to limit axial displacement of the input shaft relative to the rotor shaft.

16. The aircraft engine according to claim 1, wherein the aircraft machine is an electric motor and the rotor shaft is a rotor of the electric motor and the aircraft machine comprises a stator arranged relative to the rotor.

17. The aircraft engine according to claim 1, wherein the aircraft machine is one of an electric motor, a pump, a turbine, and a compressor.

18. The aircraft engine according to claim 1, wherein the rotor coupling comprises:
  an axial coupling portion configured to operably connect the rotor shaft to the input shaft and allow relative axial displacement between the input shaft and the rotor shaft while maintaining a sealing and a rotational energy transfer from the input shaft to the rotor shaft; and
  a radial coupling portion configured to operably connect the rotor shaft to the input shaft and allow relative radial displacement between the input shaft and the rotor shaft while maintaining the sealing and the rotational energy transfer from the input shaft to the rotor shaft.

19. An aircraft engine comprising:
  an engine housing;
  a core assembly arranged within the engine housing and comprising an engine shaft arranged axially within the engine housing extending in a forward-aftward direction;
  a tail cone assembly attached to an aft end of the engine housing, the tail cone assembly comprising:
    a tail cone housing; and
    an aircraft machine arranged within the tail cone housing, the aircraft machine comprising a rotor shaft;
    an input shaft configured between the engine shaft and the rotor shaft;

a rotor coupling configured to sealing connect the rotor shaft and the input shaft, the rotor coupling configured to provide sealing engagement between the rotor shaft and the input shaft during at least one of relative axial displacement and relative radial displacement between the rotor shaft and the input shaft, wherein the rotor coupling comprises a radial coupling portion configured to operably connect the rotor shaft to the input shaft and allow relative radial displacement between the input shaft and the rotor shaft while maintaining a sealing and a rotational energy transfer from the input shaft to the rotor shaft;

a dynamic seal arranged at a forward end of the rotor shaft and configured to rotationally seal between the rotor shaft and a fixed structure; and a ring seal arranged between an outer diameter surface of the input shaft and an inner diameter surface of the dynamic seal.

20. The aircraft engine according to claim 19, further comprising a set of seal shoulders extending radially from a surface of the input shaft and axially constraining the ring seal therebetween.

\* \* \* \* \*